United States Patent
Thomas et al.

(10) Patent No.: US 11,060,443 B1
(45) Date of Patent: Jul. 13, 2021

(54) SYSTEMS AND METHODS FOR INCREASING OXYGEN LEVELS IN AN ACTIVE PRE-CHAMBER

(71) Applicant: Ford Global Technologies, LLC, Dearborn, MI (US)

(72) Inventors: Joseph Lyle Thomas, Farmington Hills, MI (US); Ross Pursifull, Dearborn, MI (US); Adam Nathan Banker, Canton, MI (US); Mark Meinhart, Dexter, MI (US); David Bidner, Livonia, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/800,407

(22) Filed: Feb. 25, 2020

(51) Int. Cl.
  *F02D 41/30* (2006.01)
  *F02B 19/10* (2006.01)
  *F02M 61/14* (2006.01)

(52) U.S. Cl.
  CPC ...... *F02B 19/1061* (2013.01); *F02D 41/3005* (2013.01); *F02M 61/14* (2013.01)

(58) Field of Classification Search
  CPC ..... F02B 21/00; F02D 41/0025; F02M 69/08; F02M 67/02; F02M 23/00; F02M 2023/008; F02M 23/067; F02M 23/04; F02M 23/06; F02M 23/08; F02M 23/085; F02M 23/10
  See application file for complete search history.

(56) References Cited

U.S. PATENT DOCUMENTS

| | | | | | |
|---|---|---|---|---|---|
| 3,919,984 | A | * | 11/1975 | Yagi | F02B 19/1047 123/260 |
| 4,043,309 | A | * | 8/1977 | Kato | F02B 19/12 123/263 |
| 4,146,005 | A | * | 3/1979 | Wimmer | F02B 19/1014 123/285 |
| 8,925,518 | B1 | * | 1/2015 | Riley | F02B 19/1057 123/261 |
| 9,353,674 | B2 | | 5/2016 | Bunce et al. | |
| 10,018,104 | B2 | | 7/2018 | Grover, Jr. et al. | |
| 2009/0199789 | A1 | * | 8/2009 | Beard | F02B 21/00 123/2 |
| 2011/0251743 | A1 | * | 10/2011 | Hu | F02B 29/0443 701/22 |
| 2013/0025567 | A1 | * | 1/2013 | Thomassin | F01C 21/183 123/209 |
| 2015/0128898 | A1 | * | 5/2015 | Osaka | F02B 19/08 123/263 |
| 2016/0326946 | A1 | * | 11/2016 | Willi | F02B 19/08 |
| 2018/0135506 | A1 | * | 5/2018 | Grover, Jr. | F02B 19/12 |
| 2020/0158005 | A1 | * | 5/2020 | Singh | F02D 41/0002 |

* cited by examiner

*Primary Examiner* — Carl C Staubach
(74) *Attorney, Agent, or Firm* — Geoffrey Brumbaugh; McCoy Russell LLP

(57) ABSTRACT

Methods and systems are provided for increasing an amount of oxygen in a pre-chamber of a cylinder prior to combustion. In one example, a method may include purging residual gases from a pre-chamber to a cylinder via a pre-chamber air injection, and reducing a flow of the oxygen from the pre-chamber to the cylinder via a cylinder fuel injection directed toward an orifice fluidically connecting the pre-chamber with the cylinder. In this way, a composition of pre-chamber gases may be adjusted during a combustion cycle of a cylinder.

16 Claims, 4 Drawing Sheets

SYSTEMS AND METHODS FOR INCREASING OXYGEN LEVELS IN AN ACTIVE PRE-CHAMBER

FIELD

The present description relates generally to methods and systems for engines having a pre-chamber ignition system.

BACKGROUND/SUMMARY

An internal combustion engine combusts an air-fuel mixture within cylinders to produce torque, which may be used to propel a vehicle. In some such engines, an ignition source is used to ignite the air-fuel mixture within each cylinder during a compression stroke. For example, in traditional spark-ignition engines, each cylinder includes a spark plug for directly igniting the air-fuel mixture within the cylinder. In other examples, the air-fuel mixture within the cylinder may be ignited by jets of hot gas and flame from a pre-combustion chamber, referred to herein as a "pre-chamber." A "passive" pre-chamber may be a walled chamber located in the clearance volume of the cylinder and may include a spark plug. During engine operation, an air-fuel mixture is introduced into the cylinder, and a fraction of the air-fuel mixture is inducted into the pre-chamber during a compression stroke of the piston. When ignition is requested, the spark plug in the pre-chamber actuates, igniting the fraction of the air-fuel mixture in the pre-chamber. During pre-chamber combustion, jets of flame and hot gas may exit the pre-chamber and enter the cylinder via one or more holes in the pre-chamber walls. These jets ignite the air-fuel mixture in the cylinder to produce torque.

Passive pre-chamber ignition may offer performance and efficiency benefits over a traditional spark-ignition engine in some situations. For example, a cylinder with pre-chamber ignition may operate with a higher (e.g., leaner) air-fuel ratio (AFR) than a similar cylinder of a traditional spark-ignition engine, which may lead to lower fuel consumption in the cylinder with pre-chamber ignition. In other examples, a cylinder with pre-chamber ignition may produce more power than a cylinder ignited by a spark plug due to an increased burn rate in the cylinder, which may reduce an amount of time for knocking combustion to occur and thereby allow ignition timing to be advanced further toward maximum brake torque (MBT).

However, passive pre-chamber systems do not offer direct control of fuel and oxygen levels in the pre-chamber. For example, in a passive pre-chamber system, residual gases (e.g., pre-chamber exhaust gases) may build up in the pre-chamber, which may reduce an amount of oxygen in the pre-chamber. High amounts of residual gas and low amounts of oxygen in passive pre-chambers may result in decreased combustion stability and an increased incidence of pre-chamber misfire.

Other attempts to address the air and fuel control issues of passive pre-chamber systems include systems for directly injecting both fuel and air into the pre-chamber, referred to herein as an "active" pre-chamber system. One example approach is shown by Riley et al. in U.S. Pat. No. 8,925,518 B1. Therein, an active pre-chamber system including direct fuel injection and direct oxygen injection in a pre-chamber is disclosed. By including direct fuel injection in the pre-chamber, an AFR of the pre-chamber may be commanded independently of an AFR of the cylinder, which may increase combustion stability, burn rate, and cylinder efficiency.

However, the inventors herein have recognized potential issues with such systems. As one example, in systems with direct air injection, such as the approach shown by Riley et al., the directly injected oxygen may flow from the pre-chamber to the cylinder when a pressure in the cylinder is lower than a pressure in the pre-chamber, thus decreasing oxygen levels in the pre-chamber. Low levels of oxygen in the pre-chamber may decrease ignitibility and may lead to a higher incidence of misfire, particularly at low loads.

The inventors herein have identified the above-mentioned issues and have identified a method to at least partially address them. In one example, a method comprises: purging gases from a pre-chamber to a cylinder by injecting oxygen into the pre-chamber; and reducing a flow of the oxygen from the pre-chamber to the cylinder by directing fuel toward an orifice fluidically coupling the pre-chamber and the cylinder via a cylinder fuel injection event. In this way, a composition of pre-chamber gases may be adjusted during a combustion cycle in order to increase combustion stability of the pre-chamber.

As one example, purging the gases from the pre-chamber to the cylinder may include flowing the gases from the pre-chamber to the cylinder via the orifice based on a pressure difference between the pre-chamber and the cylinder. For example, the pressure difference may include a higher pressure in the pre-chamber and a lower pressure in the cylinder, which may facilitate flow from the pre-chamber to the cylinder. In particular, the gases purged from the pre-chamber may be residual gases from a previous combustion event in the pre-chamber. As one example, the oxygen may be pure oxygen, whereas in another example, the oxygen may be another combustible gas at least partially comprised of oxygen (e.g., air or oxygen-enriched air). Further, as an example, injecting oxygen into the pre-chamber may include performing a first oxygen injection into the pre-chamber during an intake stroke of the cylinder and may further include performing a second oxygen injection into the pre-chamber during a compression stroke of the cylinder. For example, the first oxygen injection may increase the pressure in the pre-chamber relative to the cylinder, and the injected oxygen may further displace the residual gases from the pre-chamber to the cylinder. As an example, an amount of the first oxygen injection may be greater than an amount of the second oxygen injection. For example, the second oxygen injection may replace any oxygen that flows to the cylinder from the pre-chamber during the purging. As an example, fuel also may be injected into the pre-chamber during the compression stroke, and the oxygen and fuel may be ignited by actuating a pre-chamber spark plug.

As another example, reducing the flow of the oxygen from the pre-chamber to the cylinder by directing the fuel toward the orifice via the cylinder fuel injection event may include at least partially occluding the orifice with a portion of fuel from the cylinder fuel injection event. For example, the cylinder may include a direct fuel injector with a spray port targeted at the orifice, and the direct fuel injector may be actuated to flow the portion of fuel from the spray port to the orifice. The portion of fuel from the cylinder fuel injection event may be a relative small mass of fuel compared with a total mass injected during the cylinder fuel injection event. The orifice may be configured to flow (gaseous) oxygen more easily than (liquid) fuel, and so by at least partially occluding the orifice with the portion of fuel, a greater amount of oxygen may remain in the pre-chamber and not flow to the cylinder compared with not directing the fuel toward the orifice.

In this way, a composition of pre-chamber gases may be adjusted during a combustion cycle of a cylinder. By controlling the composition of pre-chamber gases, an amount of oxygen in the pre-chamber before combustion may be increased while an amount of residual gas in the pre-chamber before combustion may be decreased, which may increase a performance of the cylinder. Further, by at least partially blocking pre-chamber orifices with fuel, an AFR of the cylinder may be more accurately controlled, which may increase a fuel efficiency of the vehicle and decrease vehicle emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
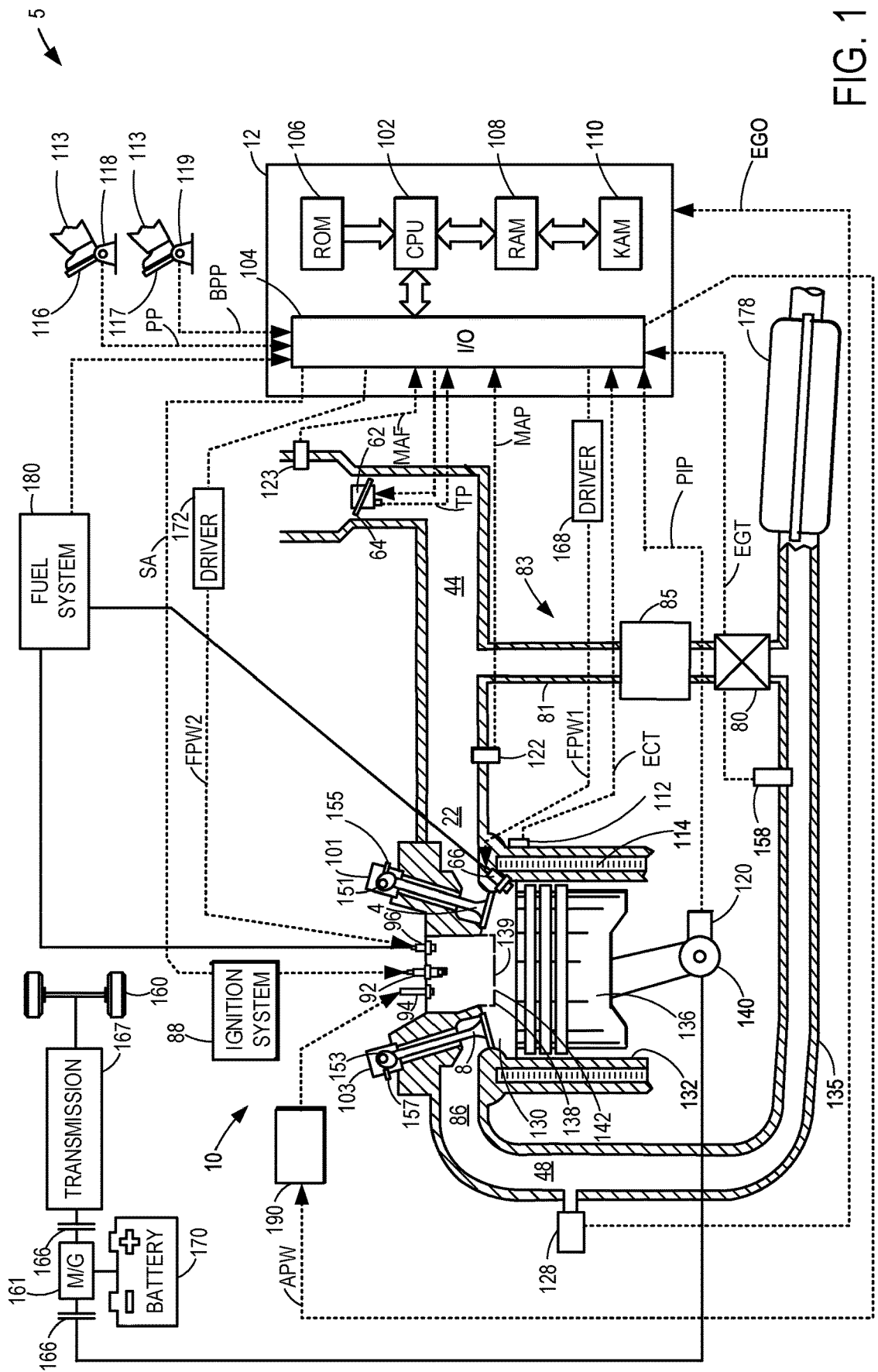
FIG. 1 shows a schematic depiction of a cylinder including a pre-chamber with direct air injection in an engine system of a vehicle.
Figure 2:
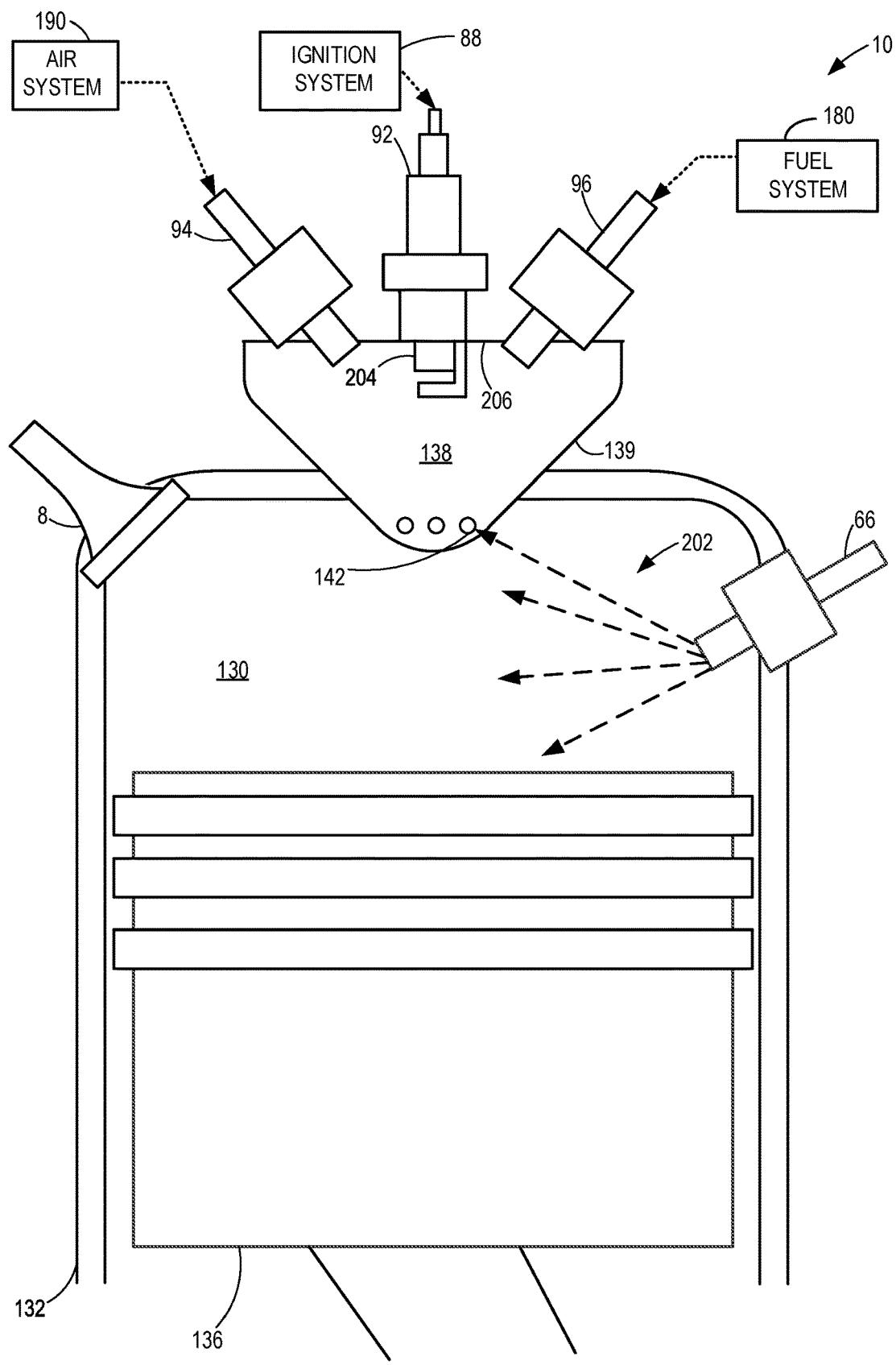
FIG. 2 schematically shows a partial view of the cylinder and pre-chamber of FIG. 1.

The following description relates to systems and methods for increasing an amount of oxygen in a pre-chamber of a cylinder. Note that as used herein, the term "air" may refer to ambient air, pure oxygen (e.g., $O_2$), or a mixture of such gases (e.g., oxygen-enriched air). The cylinder may have a cylinder configuration including an active pre-chamber that includes a fuel injector, a spark plug, and an air injector, such as shown in FIGS. 1 and 2. In particular, FIG. 1 shows the cylinder in the context of an engine system, whereas FIG. 2 highlights components of the pre-chamber. Further, the pre-chamber may be operated to provide an ignition source to the cylinder and to purge residual gases into the cylinder with direct air injection, according to the method of FIG. 3. FIG. 4 shows an example timing diagram for operating a cylinder and a pre-chamber to provide ignition and to increase an amount (or concentration) of pre-chamber oxygen.

Turning now to the figures, FIGS. 1-2 show partial views of a single cylinder 130 of an internal combustion engine 10 that may be included in a vehicle 5, with like components numbered the same and not reintroduced between figures. FIG. 1 shows cylinder 130 included in a schematic representation of vehicle 5, including exhaust system components. FIG. 2 shows a partial view of the cylinder configuration shown in FIG. 1, including a more detailed representation of cylinder 130 and a pre-chamber 138 for initiating combustion. Turning first to FIG. 1, internal combustion engine 10 may be a multi-cylinder engine. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

An exhaust passage 135 can receive exhaust gases from other cylinders of engine 10 in addition to cylinder 130. An exhaust gas sensor 128 is shown coupled to exhaust passage 135 upstream of an emission control device 178. Exhaust gas sensor 128 may be selected from among various suitable sensors for providing an indication of an exhaust gas air-fuel ratio (AFR), such as a linear oxygen sensor or UEGO (universal or wide-range exhaust gas oxygen), a two-state oxygen sensor or EGO (as depicted), a HEGO (heated EGO), a NOx sensor, a HC sensor, or a CO sensor, for example. Emission control device 178 may be a three-way catalyst, a NOx trap, various other emission control devices, or combinations thereof.

External exhaust gas recirculation (EGR) may be provided to the engine via a high pressure EGR system 83, delivering exhaust gas from a zone of higher pressure in exhaust passage 135 to a zone of lower pressure in intake manifold 44, downstream of throttle 62, via an EGR passage 81. An amount EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically activated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through EGR cooler 85 within EGR passage 81. EGR cooler 85 may reject heat from the EGR gases to engine coolant, for example.

Under some conditions, the EGR system may be used to regulate a temperature of the air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load (as estimated via pedal position sensor 134), engine speed (as estimated via a crankshaft acceleration sensor), engine temperature (as estimated via an engine coolant temperature sensor 116), etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution requirement, and further correlates the change in the dilution requirement with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor or other valve actuation device) as the output.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

As a non-limiting example, cylinder 130 is shown including a cylinder fuel injector 66. Fuel injector 66 is shown coupled directly to combustion chamber 130 for injecting fuel directly therein in proportion to a pulse-width of a signal FPW1 received from controller 12 via an electronic driver 168. In this manner, fuel injector 66 provides what is known as direct injection (hereafter also referred to as "DI") of fuel into cylinder 130. In another example, injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector. In some examples, cylinder 130 may include additional fuel injectors.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from cylinder fuel injector 66 may vary with operating conditions. Furthermore, for a single combustion event, multiple injections of the delivered fuel may be performed per cycle. The multiple injections may be performed during the compression stroke, intake stroke, or any appropriate combination thereof.

In the example shown in FIGS. 1-2, each cylinder 130 of engine 10 includes pre-chamber 138 for initiating combustion. Pre-chamber 138 is defined by pre-chamber walls 139 and includes a spark plug 92, an air injector 94, and a pre-chamber fuel injector 96. Air injector 94 is shown directly coupled to pre-chamber 138 for injecting air and/or oxygen into the pre-chamber. In some examples, air injector 94 is an electromagnetic (e.g., solenoid) injector. One or more of ambient air, oxygen, and another combustible gas may be delivered to air injector 94 from a pre-chamber air source 190. In some examples, air injector 94 is an electromagnetic (e.g., solenoid) injector, and may inject air and/or $O_2$ in proportion to a pulse-width of a signal APW received from controller 12 via pre-chamber air source 190. Note that in relation to pre-chamber air source 190, the term "air" may refer herein to ambient air, oxygen (e.g., $O_2$), hydrogen (e.g., $H_2$), or a mixture of such gases. In some examples, the pre-chamber air source 190 supplies air injector 94 with ambient air from an air intake passage of the engine, which may be stored in a pressurized tank before injection. In other examples, pre-chamber air source 190 supplies air injector 94 with onboard-generated $O_2$, which may be stored in a pressurized tank before injection. For example, the pressurized tank of pre-chamber air source 190 may be maintained at a desired pressure by an associated pump. A pressure differential between the pressurized tank and the pre-chamber and an open time of air injector 94 (e.g., as determined by the pulse-width of the signal APW) may determine the mass of air or $O_2$ delivered to pre-chamber 138, for example.

Pre-chamber fuel injector 96 is shown coupled directly to pre-chamber 138 for injecting fuel directly therein in proportion to a pulse-width of a signal FPW2 received from controller 12 via an electronic driver 172. Fuel may be provided to pre-chamber fuel injector 96 by high-pressure fuel system 180, described above. Alternatively, fuel may be provided to pre-chamber fuel injector 96 from a dedicated pre-chamber fuel system that may be included within or distinct from high-pressure fuel system 180. Thus, both air and fuel are delivered to pre-chamber 138, which may produce an air-fuel mixture with an air-fuel ratio (AFR) that may differ from an AFR in cylinder 130. In one example, the AFR in pre-chamber 138 may be richer (e.g., have a higher proportion of fuel) than the AFR in cylinder 130. In another example, the AFR in the pre-chamber may be the same as the AFR in the cylinder. In yet another example, the AFR in pre-chamber 138 may be leaner (e.g., have a higher proportion of air) than the AFR in cylinder 130.

Further, the pre-chamber walls 139 may include a plurality of openings, such as an opening 142 shown in FIGS. 1 and 2. Opening 142 provides an orifice between pre-chamber 138 and cylinder 130, fluidically coupling an interior of pre-chamber 138 to an interior of cylinder 130. As such, during some conditions, gases may flow between the interior of pre-chamber 138 and the interior of cylinder 130. For example, gases (e.g., air, fuel, and/or residual combustion gases) may flow through opening 142 with a directionality and rate based on a pressure difference across opening 142 (e.g., between the interior of pre-chamber 138 and the interior of cylinder 130). Opening 142 (along with any other openings in pre-chamber walls 139) may also provide an ignition flame from pre-chamber 138 to cylinder 130, as will be elaborated below.

An ignition system 88 may provide an ignition spark to pre-chamber 138 via spark plug 92 in response to a spark advance signal SA from controller 12, under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event. When spark plug 92 provides the ignition spark to pre-chamber 138, the air-fuel mixture within the pre-chamber may combust, the increased pressure of combustion sending jets of flame into cylinder 130 via the plurality of openings in the pre-chamber walls 139, including opening 142. The plurality of openings may be arranged such that the jets of flame are evenly distributed in cylinder 130. The jets of flame may ignite the air-fuel mixture in cylinder 130, causing combustion. After combustion, a mixture of exhaust gases from both pre-chamber 138 and cylinder 130 may be exhausted from cylinder 130 to exhaust manifold 48 via opening of exhaust valve 8.

As shown in FIG. 2, cylinder fuel injector 66 may inject fuel in a substantially cone-shaped spray pattern. The shape of the spray pattern may be the result of an injector geometry, an injection pressure, and an injection amount. The spray pattern may be defined by a plurality of fuel vectors 202, for example. In some examples, fuel injector 66 may include a plurality of spray ports, which may divide a fuel flow into a plurality of fuel jets. In such examples, the spray pattern may be defined by the plurality of fuel jets, which may follow the flow path of fuel vectors 202. As an example, a first fuel vector may be directed downwards (e.g., towards piston 136), while a second fuel vector may be directed upwards (e.g., away from piston 136), and a third fuel vector may be substantially parallel to an upper surface of piston 136. Fuel injector 66 may be configured to produce a desired spray pattern for the flow vectors 202. Further, in the example shown in FIG. 2, fuel injector 66 may be oriented with one or more of fuel vectors 202 directed to at least one pre-chamber opening, such as pre-chamber opening 142. As a result, during fuel injection in the cylinder, a fraction of an amount of fuel injected into the cylinder may be directed at any or all of the pre-chamber openings, and the fuel may at least partially occlude the corresponding pre-chamber opening with the fuel. For example, due to a higher viscosity and a higher surface tension of fuel relative to oxygen, the fuel may block the at least one pre-chamber opening, which may reduce oxygen loss in the pre-chamber.

Further, as shown in FIG. 2, a spark plug center electrode 204 may be substantially flush with a pre-chamber top surface 206 rather than offset from the pre-chamber top surface, as in traditional pre-chamber ignition systems. Positioning the spark plug electrode 204 to be flush with the pre-chamber top surface 206 eliminates a clearance volume above the electrode. In traditional pre-chamber ignition systems, residual gases may be pushed into the clearance volume, where they may not be combusted during spark plug actuation, for example. Removing the clearance volume increases a volume of an air-fuel mixture combusted in the pre-chamber, which may increase mixing and ignitibility in the pre-chamber.

As shown in FIG. 1, engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 123, an engine coolant temperature signal (ECT) from a temperature sensor 112 coupled to coolant sleeve 114, signal EGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as cylinder fuel injector 66, throttle 62, spark plug 92, pre-chamber fuel injector 96, pre-chamber air injector 94, the intake/exhaust valves and cams, etc. The controller may receive input data from the various sensors, process the input data, and trigger the actuators in response to the processed input data based on instruction or code programmed therein corresponding to one or more routines, examples of which is described with respect to FIG. 3.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

The cylinder configuration shown in FIGS. 1-2 may have increased combustion stability relative to systems without direct air injection due to higher levels of oxygen in the pre-chamber. For example, during light load operation, direct air injection may reduce an occurrence of misfire by providing additional $O_2$ for combustion. As another example, direct air injection may purge residual gas from previous combustion events in the pre-chamber via a pressure differential between the pre-chamber and the cylinder. Purging residual gas from the pre-chamber may increase a volume of fresh fuel and air in the pre-chamber for a subsequent combustion event. Further, by at least partially blocking one or more pre-chamber openings with cylinder fuel, a higher oxygen content may be maintained in the pre-chamber relative to systems without direct air injection in the pre-chamber and targeted pre-chamber opening occlusion.

Figure 3:
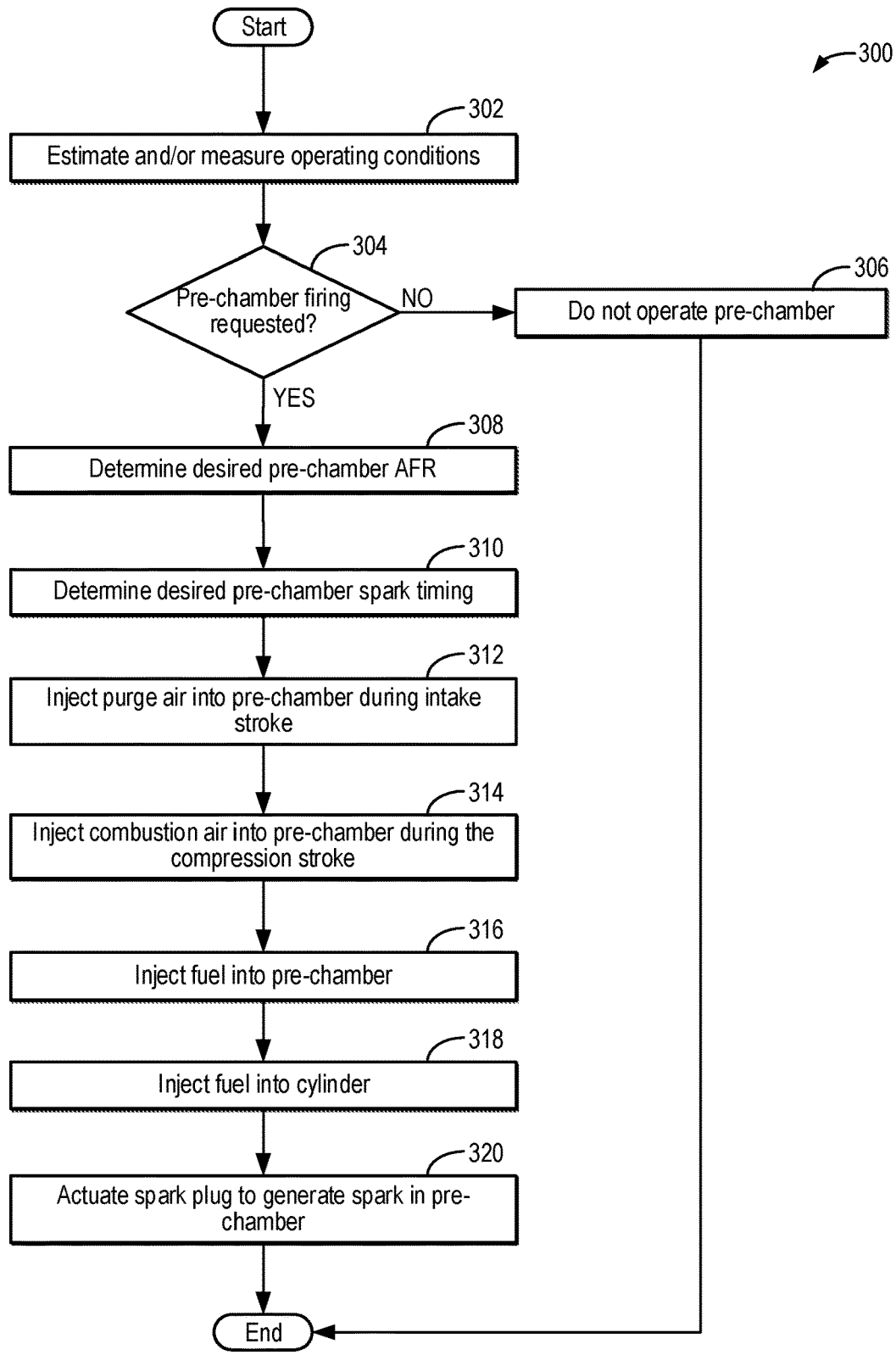
FIG. 3 shows an example method for controlling an oxygen amount in a pre-chamber via direct air injection while operating the pre-chamber to provide ignition to a cylinder.
Figure 4:
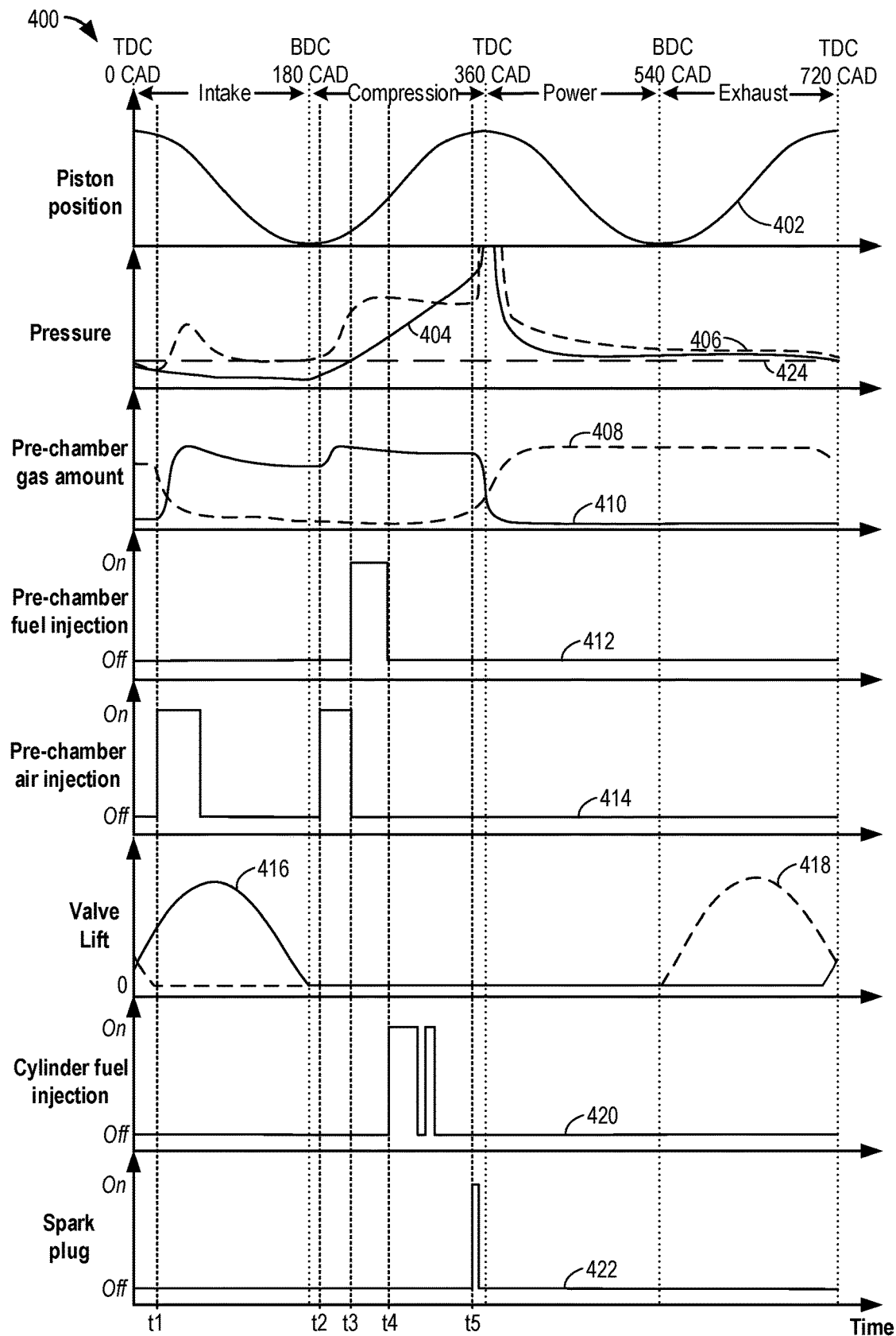
FIG. 4 shows a prophetic example timeline of operating a cylinder and pre-chamber in an engine having a pre-chamber ignition system.

Thus, FIG. 3 shows an example method for operating a pre-chamber and a cylinder of an engine to increase oxygen levels in the pre-chamber for pre-chamber ignition. As one example, operating the pre-chamber provides an ignition source for a cylinder of the engine. Method 300 will be described with respect to engine 10 and the cylinder configuration shown in FIGS. 1-2, although method 300 may be applied in other systems that include a pre-chamber with a spark plug, a fuel injector, and an air injector. Note that the air injector may inject ambient air, oxygen-enriched air, pure $O_2$, or any combination thereof. $O_2$ may be generated on-board or may be stored in a pre-filled tank. Further, method 300 will be described for one pre-chamber and cylinder pair, although it may be understood that method 300 may be simultaneously and/or sequentially executed for every cylinder of the engine. Instructions for carrying out method 300 and the rest of the methods included herein may be executed by a controller, such as controller 12 of FIG. 1, based on instructions stored on a memory of the controller and in conjunction with signals received from sensors of the engine system, such as the sensors described above with reference to FIG. 1. The controller may employ actuators of the pre-chamber ignition system and the cylinder, including a pre-chamber fuel injector (e.g., pre-chamber fuel injector 96 of FIGS. 1-2), a pre-chamber spark plug (e.g., pre-chamber spark plug 92 of FIGS. 1-2), a pre-chamber air injector (e.g., pre-chamber air injector 94 shown in FIGS. 1-2), and a cylinder fuel injector (e.g., fuel injector 66 of FIGS. 1-2) to adjust engine operation according to the methods described below.

At 302, method 300 includes estimating and/or measuring operating conditions. The operating conditions may include, for example, vehicle speed, engine speed, engine load, an engine temperature, an exhaust gas AFR, an accelerator pedal position, a brake pedal position, and a position of a throttle (e.g., throttle position). The operating conditions may be measured by one or more sensors communicatively coupled to the controller or may be inferred based on available data. For example, the accelerator pedal position may be measured by an acceleration position sensor, such as acceleration pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As another example, the exhaust gas AFR may be determined based on an oxygen level detected by an exhaust gas oxygen sensor, such as exhaust gas sensor 128 of FIG. 1. Similarly, the throttle position may be measured using a throttle position sensor coupled to the throttle.

At 304, method 300 includes determining whether a firing event is requested in the pre-chamber. In some examples, the pre-chamber firing event may be requested during nominal engine operation to provide an ignition source for the cylinder during each combustion cycle. A combustion cycle (e.g., a cylinder cycle) may refer to a four stroke movement of a piston of the cylinder, the four strokes including an intake stroke, a compression stroke, a power stroke, and an exhaust stroke. When the pre-chamber firing event is requested to provide an ignition source for the cylinder during a combustion cycle, the firing event may occur during the end of a compression stroke. In another example, the pre-chamber firing event may be requested during an exhaust stroke of a combustion cycle to increase a temperature of the pre-chamber, for example.

If the pre-chamber firing event is not requested at 304, method 300 proceeds to 306, and includes not operating the pre-chamber. In some examples, the pre-chamber firing event may not be requested while engine combustion is discontinued. For example, engine combustion may be discontinued while the engine is shut down or during a fuel-cut condition, such as when cylinder fueling is shut off while the vehicle speed decreases. In another example, the pre-chamber firing event may not be requested when the pre-chamber firing event has already been performed during the combustion cycle. Not operating the pre-chamber may include not injecting fuel and air into the pre-chamber so that there is no air-fuel mixture for combustion within the pre-chamber. Without an air-fuel mixture to combust, not operating the pre-chamber may further include not activating the spark plug in the pre-chamber. Further, because combustion is not performed in the pre-chamber, not operating the pre-chamber may further include not providing an ignition source to the cylinder. However, in other examples, an alternative ignition source may be provided to the cylinder (e.g., via a cylinder spark plug that is independent from the pre-chamber spark plug or via compression ignition). In one example, the controller may adjust the pulse-widths of actuation signals to the fuel injector and the air injector such that no air-fuel mixture is injected into the pre-chamber. For example, no actuation signal may be sent to each of the fuel injector and the air injector. Further, the controller may adjust a control signal to the ignition system of the engine such that the spark plug in the pre-chamber is not activated.

If a pre-chamber firing event is requested at 304, method 300 proceeds to 308 and includes determining a desired pre-chamber AFR (e.g., a ratio of an amount of air injected to an amount of fuel injected into the pre-chamber). The desired AFR of the pre-chamber may be determined by the controller based on the AFR of the cylinder, such that combustion of an air-fuel mixture in the pre-chamber ignites an air-fuel mixture in the cylinder while minimizing emissions, as an example. For example, the controller may input the AFR of the cylinder and the current engine operating conditions, such as engine temperature and fuel composition, into one or more look-up tables, function, and maps, which may output the desired pre-chamber AFR to achieve combustion. As an example, the desired AFR of the pre-chamber may be stoichiometry. As another example, the desired AFR of the pre-chamber may be rich relative to stoichiometry during an engine cold start condition, which may increase combustion stability in the cold start condition, for example. As still another example, the desired AFR of the pre-chamber may be richer than stoichiometry when fuels with higher evaporation temperatures, such as E85, are used in order to account for evaporated fuel that participates in the combustion and non-evaporated fuel that does not participate in combustion to achieve a substantially stoichiometry combustion with the evaporated fuel. As yet another example, the desired AFR of the pre-chamber may be adjusted from stoichiometry when an operating AFR of the cylinder is adjusted from stoichiometry such that when the combustion gases from the cylinder and the pre-chamber are combined, the combined gases have an AFR approximately equal to stoichiometry.

At 310, method 300 includes determining a desired pre-chamber spark timing for the pre-chamber firing event. Determining the desired pre-chamber spark timing may include determining when to ignite the air-fuel mixture in the pre-chamber relative to a position of a piston of the cylinder. Although a cylinder spark plug firing induces combustion in a cylinder of a traditional spark-ignition engine, in an engine with pre-chamber ignition, combustion in the pre-chamber induces combustion in the cylinder. Thus, just as cylinder spark timing in the traditional spark-ignition engine may be adjusted relative to the spark timing for maximum brake torque (MBT) based on engine operating conditions, the timing of the pre-chamber firing event may be shifted relative to MBT based on engine operating conditions in order to achieve a desired cylinder ignition timing. For example, the pre-chamber spark timing may be retarded relative to MBT timing to increase an exhaust gas temperature, while the pre-chamber spark timing may be advanced closer to MBT timing to increase a torque output of the cylinder. In one example, the controller may input one or more engine operating conditions (e.g., engine speed, engine load, the exhaust gas temperature, desired pre-chamber AFR, and cylinder AFR) into one or more look-up tables, functions, or maps to determine the desired timing for the pre-chamber firing event. In another example, the controller may make a logical determination (e.g., regarding the pre-chamber spark timing) based on logic rules that are a function of the one or more engine operating conditions.

At 312, method 300 includes injecting purge air into the pre-chamber during the intake stroke. In some examples, the air injected may be ambient air from an intake manifold of the engine, while in other examples, the pre-chamber air injector may provide onboard-generated $O_2$. For example, a purge air injection event may purge residual gases from the previous pre-chamber firing event from the pre-chamber. During the intake stroke, a pressure in the cylinder may be lower than a pressure in the pre-chamber, creating a pressure differential that may assist in purging residual gases from the pre-chamber. In some examples, the purge air injection amount may be held substantially constant. In other examples, the purge air injection amount may vary according to engine operating conditions. For example, the controller may adjust an amount of purge air injected into the pre-chamber based on the desired AFR of the pre-chamber, as determined at 308, an estimated amount of pre-chamber exhaust gas, and a piston position. As an example, the controller may input the engine operating conditions, including the piston position and the desired AFR of the pre-chamber, into a look-up table, algorithm, or map, which may output a desired purge air injection amount. After determining the amount of purge air to be injected, the controller may inject the desired purge air amount by adjusting the pulse-width of an actuation signal sent to the pre-chamber air injector.

At 314, method 300 includes injecting combustion air into the pre-chamber during the compression stroke of the cylinder. A combustion air injection may provide oxygen-rich air to the pre-chamber for combustion. Further, the combustion air may replace an amount of purge air that may flow to the cylinder during the intake stroke due to the pressure differential between the pre-chamber and the cylinder. Combustion air may be injected at the beginning of the combustion stroke, for example. In one example, the controller may adjust an amount of combustion air injected into the pre-chamber based on the desired AFR of the pre-chamber, as determined at 208, and the position of the piston in the cylinder. For example, the controller may input the engine operating conditions, including the piston position and the desired AFR of the pre-chamber, into a look-up table, algorithm, or map, which may output a desired combustion air injection amount. In some examples, the combustion air injection amount may be held substantially constant while only a fuel injection amount is varied to compensate for changes in the desired AFR (as described below at 316). For example, an amount of combustion air injected may be approximately equal to the volume in the pre-chamber. After determining the amount of air to be injected, the controller may inject the desired combustion air amount by adjusting the pulse-width of an actuation signal sent to the pre-chamber air injector.

At 316, method 300 includes injecting fuel into the pre-chamber. The controller may adjust the amount of fuel injected into the pre-chamber based on the desired AFR of the pre-chamber, as determined at 308, and the amount of air injected at 312 and 314. For example, the controller may input the desired pre-chamber AFR and the amount of air injected at 312 and 314 into one or more look-up tables, functions, and maps, which may output a desired fuel amount to inject that will achieve the desired AFR in the pre-chamber. In one example, the controller may inject the desired fuel amount by adjusting the pulse-width of an actuation signal sent to the pre-chamber fuel injector, such as FPW2 shown in FIG. 1. The injected fuel may mix with the injected air (e.g., injected at 312 and 314) to form an air-fuel mixture.

At 318, method 300 includes injecting fuel into the cylinder. The controller may adjust an amount of fuel injected into the cylinder based on a desired AFR of the cylinder and an amount of air inducted into the cylinder. For example, the controller may input a desired cylinder AFR and an estimated amount of air inducted into the cylinder into one or more look-up tables, functions, or maps, which may output a desired fuel amount to inject that will achieve the desired AFR in the cylinder. Further, the injection pressure and timing may be determined to increase a burn rate and/or an ignitibility of the air-fuel mixture in the cylinder. For example, the controller may input the desired pre-chamber AFR and engine operating conditions such as engine load into one or more look-up tables, functions, and maps, which may output a desired fuel amount to inject that will achieve desired combustion qualities the pre-chamber. In one example, the controller may inject the desired fuel amount by adjusting a pulse-width of an actuation signal sent to the cylinder fuel injector, such as FPW1 shown in FIG. 1. In some examples, the determined amount of fuel may be injected in a single injection event, while in other examples, the determined amount of fuel may be distributed over a plurality of injection events.

Additionally, the control of injection timing influences a total amount of fuel that flows into the pre-chamber. For example, a first amount of fuel may be injected just before or at the beginning of a compression stroke of the cylinder in order to increase a fuel concentration in the pre-chamber. Such an injection may be referred to herein as a "pre-compression" injection. The injected fuel may mix with air inducted to the cylinder during the intake stroke to form an air-fuel mixture, a portion of which may be pushed into the pre-chamber during the compression stroke due to a pressure differential between the pre-chamber and the cylinder. The fuel provided to the pre-chamber from the pre-compression cylinder fuel injection may be in addition to or as an alternative to the pre-chamber fuel injection described above at 316. Further still, in some examples, injecting fuel into the cylinder may include directing a fraction of the fuel amount at one or more pre-chamber openings, such as pre-chamber opening 142 of FIGS. 1 and 2, in order to saturate the opening with fuel. Due to the higher viscosity of the fuel relative to the viscosity of air, the fuel may create an air-tight seal across the one or more pre-chamber openings, which may prevent injected air from flowing from the pre-chamber to the cylinder before pre-chamber combustion. In one example, the controller may direct the desired fuel amount to the pre-chamber openings by adjusting the pulse-width of the actuation signal sent to the cylinder fuel injector. As an example, the controller may command a first, larger cylinder fuel injection to provide fuel for cylinder combustion (e.g., the first amount of fuel described above), and then the controller may command a second, smaller cylinder fuel injection in order to fully saturate one or more pre-chamber openings. The controller may control a spray pattern of the fuel injector such that only the second, smaller cylinder fuel injection saturates the one or more pre-chamber openings, for example. In particular, the second, smaller cylinder fuel injection may be commanded at a higher injection pressure relative to the first, larger fuel injection, which may increase a magnitude of a fuel vector (e.g., one or more of fuel vectors 202 of FIG. 2). Increasing the magnitude of a fuel vector may increase a distance travelled by injected fuel. As an example, the fuel injector may include a plurality of openings, with at least one opening impinging on the one or more pre-chamber openings when fuel is injected at a certain injection pressure. An injection direction of the at least one opening may be a property of injector geometry and placement. For example, at a certain fuel injection pressure, fuel from the at least one opening may saturate the one or more pre-chamber openings. Further, this second injection may occur during the compression stroke and prior to ignition and may be referred to herein as a "compression injection."

As one example, the AFR in each chamber (e.g., the pre-chamber and the main chamber) may be controlled by a ratio fuel injection during and prior to (or at the beginning of) compression stroke (e.g., the pre-compression injection) versus the amount of fuel injected during the compression phase (e.g., the compression injection). The amount of fuel that flows into the pre-chamber during the compression injection may be determined experimentally for all loads and speeds and stored as a look-up table or calibration that the controller may reference to determine the ratio of pre-compression injection and compression injection. In this way, any air-fuel ratio may be obtained in the pre-chamber and also any different air-fuel ratio may be obtained in the main chamber.

At 320, method 300 includes actuating the pre-chamber spark plug to generate a spark in the pre-chamber. The controller may generate a control signal (e.g., signal SA) that is sent an ignition system (e.g., ignition system 88 of FIGS. 1 and 2) to actuate the pre-chamber spark plug at the pre-chamber spark timing determined at 310. Generating the spark in the pre-chamber may cause the air-fuel mixture in the pre-chamber to combust, sending jets of hot gas and flame into the cylinder via the pre-chamber openings. When the cylinder also includes a combustible air-fuel mixture, the jets of hot gas and flame ignite the air-fuel mixture in the cylinder. After 320, method 300 may end.

In this way, an amount of oxygen in a pre-chamber of a cylinder may be increased. Specifically, actively injecting both air and fuel into the pre-chamber increases a control and an accuracy of the amount of oxygen in the pre-chamber relative to passive pre-chamber systems (e.g., pre-chamber systems without active air injection and active fuel injection). Due to the increased amount of oxygen in the pre-chamber, the pre-chamber may more reliably combust a first air-fuel mixture in the pre-chamber, thus providing an ignition source to a second air-fuel mixture in the cylinder, which may combust in order to provide torque to the engine. The presence of oxygen-rich air, and the removal of residual exhaust gases, may increase combustion stability in the pre-chamber relative to active pre-chamber systems without purging. In some examples, method 300 may run continuously during nominal engine operation in order to continuously increase combustion stability in the pre-chamber and reliably provide ignition to the cylinder. With active air and fuel injection in the pre-chamber, the AFR of the first air-fuel mixture may be predicted based on injection amounts of the air and fuel, which may increase ignition control, and active air injection may further purge the pre-chamber of residual gases from previous combustion cycles, for example. Further, with jets of flame and hot gas used as the cylinder ignition source, the second air-fuel mixture in the cylinder may combust more fully and with a lower peak combustion temperature than using a spark plug as the cylinder ignition source. Thus, by using a pre-chamber ignition system, the second air-fuel mixture in the cylinder may be commanded lean relative to stoichiometry without a reduction in combustion stability and without an increase in $NO_x$ emissions and/or combustion temperatures.

Next, FIG. 4 shows a prophetic example timeline 400 of a relationship between piston position, relative cylinder and pre-chamber pressures, and relative pre-chamber gas composition while operating the pre-chamber with active purging and operating the cylinder to at least partially occlude openings of the pre-chamber with cylinder fuel. In particular, the pre-chamber is an active pre-chamber including direct air and fuel injection. The cylinder may be cylinder 130 of engine 10 including pre-chamber 138 shown in FIGS. 1 and 2, for example. Timeline 400 shows cylinder operating during a single combustion cycle, wherein the combustion cycle (e.g., cylinder cycle) refers to four strokes of a piston within the cylinder (e.g., intake, compression, power, and exhaust). A piston position relative to top dead center (TDC, the point at which the piston is closest to the cylinder head and a volume in the cylinder is smallest), bottom dead center (BDC, the point at which the piston is farthest from the cylinder head and the volume in the cylinder is largest), and the four strokes of the combustion cycle is shown in plot 402. Further, a pressure in the cylinder (e.g., a cylinder pressure) is shown in plot 404, a pressure in the pre-chamber (e.g., a pre-chamber pressure) is shown in dashed plot 406, a pre-chamber residual gas amount is shown in dashed plot 408, a pre-chamber air amount is shown in plot 410, a pre-chamber fuel injection signal is shown in plot 412, a pre-chamber air injection signal is shown in plot 414, an intake valve lift is shown in plot 416, an exhaust valve lift is shown in dashed plot 418, a cylinder fuel injection signal is shown in plot 420, and a spark plug actuation signal is shown in plot 422. Further, atmospheric pressure is shown by dashed line 424.

For all of the above, the horizontal axis represents time, with time increasing along the horizontal axis from left to right. Reference is also made to a relative engine position (e.g., in crank angle degrees, CAD), which changes with time. For example, as mentioned above, one combustion cycle is shown, which occurs from 0 to 720 CAD (e.g., two full rotations of an engine crankshaft). In the example of timeline 400, 0 CAD is defined as TDC of the of the intake stroke. The vertical axis represents each labeled parameter. For plot 402, the vertical axis shows piston position relative to TDC. For plots 404, 406, 408, 410 416, and 418, a magnitude of the parameter increases up the vertical axis from bottom to top. For each of the plots 412, 414, 420, and 422, the vertical axis indicates whether the signal is on (e.g., the corresponding injector or spark plug is actuated) or off (e.g., the corresponding injector or spark plug is not actuated), as labeled. For plots 416 and 418, the lift of the corresponding valve increases up the vertical axis from zero. Further, the stroke of the combustion cycle is indicated at the top of timing chart 400. The intake stroke corresponds to an interval from 0 CAD to 180 CAD, the compression stroke corresponds to an interval from 180 CAD to 360 CAD, the power stroke corresponds to an interval from 360 CAD to 540 CAD, and the exhaust stroke corresponds to an interval from 540 CAD to 720 CAD.

Just prior to the start of the intake stroke of the combustion cycle, the intake valve is opened (plot 416). As shown in timeline 400, an exhaust valve open duration may overlap with an intake valve open duration, in some examples. For example, the exhaust valve is closed (dashed plot 418) after the start of the intake stroke, resulting in positive valve overlap between the intake valve and the exhaust valve. Just prior to time t1, cylinder pressure (plot 404) and pre-chamber pressure (dashed plot 406) are both slightly below atmospheric pressure, with a difference between the cylinder pressure and the pre-chamber pressure relatively small. The pre-chamber does not contain fresh air (plot 410) prior to time t1, instead holding residual gas (dashed plot 408) from the previous combustion cycle.

The piston position (plot 402) decreases throughout the intake stroke. Cylinder pressure (plot 404) decreases relative to atmospheric pressure (dashed line 424) throughout the intake stroke as cylinder volume increases. Further, as fresh air flows into the cylinder, the amount of air in the pre-chamber increases (plot 410). At time t1, after the start of the intake stroke (e.g., around 20 CAD), air is injected into the pre-chamber (plot 414) during a first air injection event. As a result of the first air injection event, the amount of pre-chamber air (plot 410) increases, and the pre-chamber pressure (dashed plot 406) increases. Further, the first air injection event purges an amount of residual gas from the pre-chamber to the cylinder, decreasing the amount of residual gas in the pre-chamber (dashed plot 408), with the newly injected air displacing the residual gas.

During the remainder of the intake stroke (e.g., between 20 and 180 CAD), air is introduced into the cylinder via the open intake valve (plot 416) as the piston (plot 402) moves toward BDC, where the piston is at its bottom-most position in the cylinder and the end of the intake stroke (e.g., when the combustion chamber is at its largest volume). In response, pre-chamber pressure (plot 406) and cylinder pressure (plot 404) continues to gradually decrease with piston position (plot 402). During the intake stroke, particularly following the purging of the residual gases to the cylinder, air may flow from the pre-chamber into the cylinder due to the pressure difference between the cylinder and the pre-chamber, decreasing the amount of air in the pre-chamber (plot 410).

At the beginning of the compression stroke (e.g., around 180 CAD), the intake valve closes (plot 416). The piston (plot 402) moves toward the cylinder head so as to compress the air within the cylinder, causing the cylinder pressure (plot 404) and the pre-chamber pressure (dashed plot 406) to increase. During the compression stroke, as the piston moves toward TDC (plot 402), a series of injection events may introduce an air-fuel mixture into the pre-chamber. First, at time t2, a second air injection event (plot 414) injects air into the pre-chamber while the piston position (plot 402) is relatively low (e.g., while cylinder pressure is relatively low, as shown in plot 404), causing the pre-chamber pressure (dashed plot 406) to increase relative to the cylinder pressure (plot 404). Due to the additional air injection, the amount of air in the pre-chamber (plot 410)

increases. Further, in the example shown in FIG. 4, a pulse-width of the second air injection event is smaller than a pulse-width of the first air injection event. As a result, a smaller amount of air is injected during the second air injection event than in the first air injection event. The second air injection may replenish air that flows from the pre-chamber to the cylinder during the intake stroke, for example.

Next, as the piston position further increases, a pre-chamber fuel injection event beginning at time t3 (plot 412) introduces pre-chamber fuel into the pre-chamber, which creates an air-fuel mixture in the pre-chamber and increases the pre-chamber pressure (dashed plot 406). In order to introduce an air-fuel mixture in the cylinder, a cylinder fuel injector introduces a first amount of cylinder fuel (plot 420) into the cylinder approximately halfway through the compression stroke (e.g., around 250 CAD) beginning at time t4. To saturate the one or more pre-chamber openings with fuel, the cylinder fuel injector introduces a second amount of cylinder fuel (plot 420) into the cylinder a pre-determined number of crank angle degrees after the injecting the first amount of cylinder fuel. The fuel saturating the pre-chamber opening(s) prevents a decrease in the pre-chamber air amount. Accordingly, around 250 CAD, pre-chamber pressure (dashed plot 406) and air amount (plot 410) remain relatively constant, while cylinder pressure (plot 404) increases due to the increasing piston position (plot 402).

Just before the end of the compression stroke at time t5 (e.g., around 700 CAD), the spark plug actuates (plot 422) in order to trigger combustion of the air-fuel mixture in the pre-chamber. Combustion in the pre-chamber causes jets of hot gas and flame to exit the pre-chamber and ignite the air-fuel mixture in the cylinder, thus providing power to drive down the piston during the power stroke. Accordingly, pre-chamber pressure (dashed plot 406) increases exponentially after spark plug actuation (plot 422), while the pre-chamber air amount (plot 410) decreases as a combustion reaction in the pre-chamber consumes oxygen. Further, the amount of residual gas in the pre-chamber increases (dashed plot 408). Further, the combustion reaction in the pre-chamber triggers a combustion reaction in the cylinder, causing cylinder pressure (plot 404) to increase. Note that the high pressures (e.g., the pre-chamber pressure in dashed plot 406 and the cylinder pressure in plot 404) during combustion are cropped from view in FIG. 4 due to the high magnitude of the peak combustion pressures relative to the pressures in the other portions of the combustion cycle (e.g., the intake stroke).

At the end of the power stroke (e.g., around 540 CAD), the exhaust valve opens (dashed plot 418) to allow exhaust gas to flow from the cylinder. The exhaust valve may remain open during the exhaust stroke (e.g., 540 CAD to 720 CAD). During the exhaust stroke, a relatively large amount of residual gas remains in the pre-chamber (dashed plot 408), while virtually no fresh air may be present in the pre-chamber (plot 410). For example, the residual gas may remain in the pre-chamber until purged during a subsequent intake stroke.

In this way, a cylinder with a pre-chamber may be operated to purge an amount of residual gases and increase an amount of oxygen during a combustion cycle. By injecting air into the pre-chamber, residual gases are purged and oxygen is added to the pre-chamber, which may increase the total amount of oxygen in the pre-chamber prior to combustion. Increasing the amount of oxygen in the pre-chamber may reduce an occurrence of pre-chamber misfire during low-load operation. Further, by occluding a pre-chamber orifice via a cylinder fuel injection, an airflow out of the cylinder is reduced. Further, by directly injecting air and by at least partially blocking pre-chamber orifices with fuel, an AFR of the pre-chamber may be more accurately controlled, increasing the fuel efficiency of the vehicle and decreasing vehicle emissions.

The technical effect of actively injecting air into a pre-chamber is that combustion stability and ignitibility in the pre-chamber may be increased, thereby decreasing an incidence of misfire that may otherwise result from pre-chamber operation.

As an example, a method comprises purging gases from a pre-chamber to a cylinder by injecting oxygen into the pre-chamber; and reducing a flow of the oxygen from the pre-chamber to the cylinder by directing fuel toward an orifice fluidically coupling the pre-chamber and the cylinder via a cylinder fuel injection event. In the preceding example, additionally or optionally, purging the gases from the pre-chamber to the cylinder includes flowing the gases from the pre-chamber to the cylinder via the orifice based on a pressure difference between the pre-chamber and the cylinder, and the gases are residual gases from a previous combustion event in the pre-chamber. In one or both of the preceding examples, additionally or optionally, injecting oxygen into the pre-chamber includes performing a first oxygen injection into the pre-chamber during an intake stroke of the cylinder. In any or all of the preceding examples, additionally or optionally, injecting oxygen into the pre-chamber further includes performing a second oxygen injection into the pre-chamber during a compression stroke of the cylinder. In any or all of the preceding examples, additionally or optionally, an amount of the first oxygen injection is greater than an amount of the second oxygen injection. In any or all of the preceding examples, the method additionally or optionally further comprises injecting fuel into the pre-chamber during the compression stroke; and combusting the oxygen and the fuel in the pre-chamber by actuating a pre-chamber spark plug. In any or all of the preceding examples, additionally or optionally, reducing the flow of the oxygen from the pre-chamber to the cylinder by directing the fuel toward the orifice via the cylinder fuel injection event includes at least partially occluding the orifice with a portion of fuel from the cylinder fuel injection event, the portion of fuel from the cylinder fuel injection event flowing from a spray port of a direct fuel injector of the cylinder that is directed at the orifice. In any or all of the preceding examples, additionally or optionally, the oxygen includes a gas at least partially comprised of oxygen. In any or all of the preceding examples, additionally or optionally, the gas at least partially comprised of oxygen includes pure oxygen. In any or all of the preceding examples, additionally or optionally, the gas at least partially comprised of oxygen includes oxygen-enriched air.

As another example, a method comprises: during an intake stroke of a cylinder, performing a first air injection into a pre-chamber to flow residual exhaust gas from the pre-chamber to the cylinder via a pre-chamber opening; and during a compression stroke of the cylinder, performing a second air injection into the pre-chamber and injecting fuel into the cylinder, a portion of the fuel injected into the cylinder directed at the pre-chamber opening. In the previous example, additionally or optionally, the intake stroke and the compression stroke are in a same combustion cycle of the cylinder. In one or both of the preceding examples, the method additionally or optionally further comprises, during the compression stroke of the cylinder: injecting pre-chamber fuel into the pre-chamber after performing the second air injection into the pre-chamber; and actuating a spark plug of the pre-chamber after both injecting the pre-chamber fuel into the pre-chamber and injecting fuel into the cylinder. In any or all of the preceding examples, additionally or optionally, injecting fuel into the cylinder includes actuating a direct fuel injector coupled to the cylinder for at least one fuel injection event. In any or all of the preceding examples, additionally or optionally, the portion of the fuel injected into the cylinder directed at the pre-chamber opening at least partially blocks the pre-chamber opening.

As another example, a system comprises: an engine including a plurality of cylinders, each cylinder including a cylinder fuel injector and a pre-chamber of a pre-chamber ignition system, the pre-chamber fluidically coupled to the cylinder via a pre-chamber opening; and a controller storing executable instructions in non-transitory memory that, when executed, cause the controller to: purge gases from the pre-chamber to the corresponding cylinder; and inject fuel onto the pre-chamber opening via the cylinder fuel injector. In the preceding example, additionally or optionally, the pre-chamber includes a spark plug configured to initiate combustion in the pre-chamber, and an electrode of the spark plug is flush with a top surface of the pre-chamber, and wherein the gases purged from the pre-chamber to the corresponding cylinder are residual gases from a previous combustion event in the pre-chamber. In one or both of the preceding examples, additionally or optionally, the pre-chamber further includes an air injector, and to purge the gases from the pre-chamber to the corresponding cylinder, the controller includes further instructions stored in non-transitory memory that, when executed, cause the controller to: actuate the air injector during an intake stroke of the cylinder to displace the residual gases from the previous combustion event in the pre-chamber with injected air. In any or all of the preceding examples, additionally or optionally, the cylinder fuel injector includes a nozzle configured to spray fuel in a plurality of fuel flow vectors, at least one fuel flow vector of the plurality of fuel flow vectors directed at the pre-chamber opening, and to inject fuel onto the pre-chamber opening via the cylinder fuel injector, the controller includes further instructions in non-transitory memory that, when executed, cause the controller to: actuate the cylinder fuel injector to spray fuel onto the pre-chamber opening via the at least one fuel flow vector during a compression stroke of the cylinder. In any or all of the preceding examples, additionally or optionally, the pre-chamber further includes a pre-chamber fuel injector, and the controller includes further instructions stored in non-transitory memory that, when executed, cause the controller to: actuate the pre-chamber fuel injector during a compression stroke of the cylinder immediately following the intake stroke to inject fuel into the pre-chamber; and actuate the spark plug to combust air and fuel in the pre-chamber.

In another representation, a method comprises: responsive to a cylinder pressure above a first threshold cylinder pressure, injecting a first amount of cylinder fuel with a first flow vector with a first flow vector via a cylinder fuel injector; and responsive to a cylinder pressure above a second threshold cylinder pressure, injecting a second amount of cylinder fuel with a second flow vector via the cylinder fuel injector, the second flow vector impinging on at least one pre-chamber opening of the cylinder. In the preceding example, additionally or optionally, the second amount of cylinder fuel at least partially blocks the at least one pre-chamber opening. In one or both of the preceding examples, additionally or optionally, injecting the second amount of cylinder fuel with the second flow vector includes adjusting an injection pressure based on an injector geometry, a pre-chamber geometry, a desired cylinder AFR, and a desired pre-chamber AFR. In any or all of the preceding examples, additionally or optionally, injecting the first amount of cylinder fuel with the first flow vector includes adjusting an injection pressure based on an injector geometry, a pre-chamber geometry, a desired cylinder AFR, and a desired pre-chamber AFR. In any or all of the preceding examples, additionally or optionally, the second threshold cylinder pressure is higher than the first threshold cylinder pressure. In any or all of the preceding examples, the method additionally or optionally further comprises injecting oxygen into the pre-chamber during the compression stroke; injecting fuel into the pre-chamber during the compression stroke; and combusting the oxygen and the fuel in the pre-chamber by actuating a pre-chamber spark plug.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
purging gases from a pre-chamber to a cylinder by injecting oxygen into the pre-chamber, including performing a first oxygen injection into the pre-chamber during an intake stroke of the cylinder and performing a second oxygen injection into the pre-chamber during a compression stroke of the cylinder, wherein an amount of the first oxygen injection is greater than an amount of the second oxygen injection; and
reducing a flow of the oxygen from the pre-chamber to the cylinder by directing fuel toward an orifice fluidically coupling the pre-chamber and the cylinder via a cylinder fuel injection event.

2. The method of claim 1, wherein purging the gases from the pre-chamber to the cylinder includes flowing the gases from the pre-chamber to the cylinder via the orifice based on a pressure difference between the pre-chamber and the cylinder, and the gases are residual gases from a previous combustion event in the pre-chamber.

3. The method of claim 1, further comprising:
injecting fuel into the pre-chamber during the compression stroke; and
combusting the oxygen and the fuel in the pre-chamber by actuating a pre-chamber spark plug.

4. The method of claim 1, wherein reducing the flow of the oxygen from the pre-chamber to the cylinder by directing the fuel toward the orifice via the cylinder fuel injection event includes at least partially occluding the orifice with a portion of the fuel from the cylinder fuel injection event, the portion of the fuel from the cylinder fuel injection event flowing from a spray port of a direct fuel injector of the cylinder that is directed at the orifice.

5. The method of claim 1, wherein the oxygen is included in ambient air, and injecting the oxygen into the pre-chamber comprises injecting the ambient air into the pre-chamber.

6. The method of claim 1, wherein the oxygen is included in oxygen-enriched air, and injecting the oxygen into the pre-chamber comprises injecting the oxygen-enriched air into the pre-chamber.

7. A method, comprising:
during an intake stroke of a cylinder, performing a first air injection into a pre-chamber to flow residual exhaust gas from the pre-chamber to the cylinder via a pre-chamber opening; and
during a compression stroke of the cylinder, performing a second air injection into the pre-chamber, an amount of the second air injection smaller than an amount of the first air injection, and injecting fuel into the cylinder, a portion of the fuel injected into the cylinder directed at the pre-chamber opening.

8. The method of claim 7, wherein the intake stroke and the compression stroke are in a same combustion cycle of the cylinder.

9. The method of claim 7, further comprising, during the compression stroke of the cylinder:
injecting pre-chamber fuel into the pre-chamber after performing the second air injection into the pre-chamber; and
actuating a spark plug of the pre-chamber after both injecting the pre-chamber fuel into the pre-chamber and injecting the fuel into the cylinder.

10. The method of claim 7, wherein injecting the fuel into the cylinder includes actuating a direct fuel injector coupled to the cylinder for at least one fuel injection event.

11. The method of claim 7, wherein the portion of the fuel injected into the cylinder directed at the pre-chamber opening at least partially blocks the pre-chamber opening.

12. A system, comprising:
an engine including a plurality of cylinders, each cylinder including a cylinder fuel injector and a pre-chamber of a pre-chamber ignition system, the pre-chamber fluidically coupled to the corresponding cylinder via a pre-chamber opening; and
a controller storing executable instructions in non-transitory memory that, when executed, cause the controller to:
purge gases from the pre-chamber to the corresponding cylinder by performing a first air injection into the pre-chamber during an intake stroke of the corresponding cylinder and performing a second air injection into the pre-chamber during a compression stroke of the corresponding cylinder, a first amount of air injected in the first air injection greater than a second amount of the air injected in the second air injection; and
inject fuel onto the pre-chamber opening via the cylinder fuel injector.

13. The system of claim 12, wherein the pre-chamber includes a spark plug configured to initiate combustion in the pre-chamber, and wherein the gases purged from the pre-chamber to the corresponding cylinder are residual gases from a previous combustion event in the pre-chamber.

14. The system of claim 13, wherein the pre-chamber further includes an air injector, and to purge the gases from the pre-chamber to the corresponding cylinder, the controller includes further instructions stored in the non-transitory memory that, when executed, cause the controller to:
actuate the air injector during the intake stroke of the corresponding cylinder to inject the first amount of the air; and
actuate the air injector during the compression stroke of the corresponding cylinder to inject the second amount of the air.

15. The system of claim 14, wherein the cylinder fuel injector includes a nozzle configured to spray the fuel in a plurality of fuel flow vectors, at least one fuel flow vector of the plurality of fuel flow vectors directed at the pre-chamber opening, and to inject the fuel onto the pre-chamber opening via the cylinder fuel injector, the controller includes further instructions in the non-transitory memory that, when executed, cause the controller to:
actuate the cylinder fuel injector to spray the fuel onto the pre-chamber opening via the at least one fuel flow vector during the compression stroke of the corresponding cylinder.

16. The system of claim 15, wherein the pre-chamber further includes a pre-chamber fuel injector, and the controller includes further instructions stored in the non-transitory memory that, when executed, cause the controller to:
actuate the pre-chamber fuel injector during the compression stroke of the corresponding cylinder immediately following the intake stroke to inject the fuel into the pre-chamber; and
actuate the spark plug to combust the air and the fuel in the pre-chamber.

* * * * *